(12) United States Patent
Foster et al.

(10) Patent No.: US 10,027,706 B2
(45) Date of Patent: Jul. 17, 2018

(54) ANTI-SPOOFING PROTECTION IN AN AUTOMOTIVE ENVIRONMENT

(71) Applicant: GOOGLE INC., Mountain View, CA (US)

(72) Inventors: Andrew Foster, Naremburn (AU); Nicholas Julian Pelly, Manly (AU); Zheng Wang, Arncliffe (AU)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/242,121

(22) Filed: Aug. 19, 2016

(65) Prior Publication Data

US 2016/0373999 A1 Dec. 22, 2016

Related U.S. Application Data

(63) Continuation of application No. 14/180,212, filed on Feb. 13, 2014, now abandoned.

(51) Int. Cl.

| H04L 29/06 | (2006.01) |
| H04W 4/02 | (2018.01) |
| H04W 12/12 | (2009.01) |
| H04W 4/80 | (2018.01) |
| H04W 76/11 | (2018.01) |

(52) U.S. Cl.
CPC ........... *H04L 63/1466* (2013.01); *H04W 4/02* (2013.01); *H04W 12/12* (2013.01); *H04W 4/80* (2018.02); *H04W 76/11* (2018.02)

(58) Field of Classification Search
CPC ............. G06Q 20/40145; G06Q 20/32; G06Q 30/0267; G06Q 20/327; G06Q 20/3821; G06Q 20/3829; G06Q 30/0261; G06Q 20/4012; G06Q 50/30; H04L 63/102; H04L 67/306; H04L 67/22; H04L 2463/121; H04L 63/105
See application file for complete search history.

(56) References Cited

U.S. PATENT DOCUMENTS

| 8,984,581 B2 | 3/2015 | Luna et al. |
| 9,178,877 B1* | 11/2015 | Koneru ............... H04L 63/0853 |
| 2008/0148374 A1 | 6/2008 | Spaur et al. |
| 2010/0191973 A1 | 7/2010 | Huntzicker et al. |
| 2010/0201543 A1 | 8/2010 | Shorey et al. |
| 2012/0159170 A1 | 6/2012 | Lee et al. |
| 2012/0313796 A1* | 12/2012 | Lee ..................... B60R 25/2018 340/989 |

(Continued)

*Primary Examiner* — Kwasi Karikari
(74) *Attorney, Agent, or Firm* — Marshall, Gerstein & Borun LLP

(57) ABSTRACT

To automatically identify an attempt at presenting falsified vehicle identifiers to portable devices, (i) a vehicle identifier reported by a vehicle with which the portable device is establishing a short-range communication link, and (ii) an indication of a current location of the portable device, are received from a portable device at a first time. An indication of a recent location at which the vehicle identifier was reported at a second time is obtained. The current location of the portable device is compared to the recent location of the vehicle, in view of the first time and the second time. In response to determining that the current location is not proximate to the recent reported location of the vehicle, an indication that the reported identifier is likely falsified is generated.

17 Claims, 5 Drawing Sheets

(56) References Cited

U.S. PATENT DOCUMENTS

2014/0096217 A1    4/2014   Lehmann
2014/0187205 A1    7/2014   Dankar et al.
2014/0270172 A1    9/2014   Peirce

* cited by examiner

ANTI-SPOOFING PROTECTION IN AN AUTOMOTIVE ENVIRONMENT

FIELD OF TECHNOLOGY

This application generally relates to interactive digital maps and, more particularly, to adding data from third-party content providers to digital maps.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many vehicles today are equipped with head units that can establish wired or wireless short-range communication links with portable user devices such as smartphones. A user can, for example, direct audio output from her smartphone via the head unit to amplify the sound, or provide voice commands to the head unit to originate a call from the smartphone when driving.

As the number of applications of head unit-to-smartphone connections continues to grow, the risk that an unauthorized device accesses the smartphone by masquerading as a legitimate head unit also increases. For example, an aftermarket vendor of a head unit can clone the identifier of a legitimate, properly authorized head unit. The head unit then can replay the cloned identifier to the smartphone to trick the smartphone into "thinking" that it is connected to an authorized vehicle. Further, some original equipment manufacturers (OEM)s can allocate identifiers sequentially, and aftermarket vendors can cycle through blocks of potentially valid numbers to find an identifier the smartphone accepts.

SUMMARY

A method for automatically identifying attempts at presenting falsified vehicle identifiers to portable devices for the purpose of establishing unauthorized communication links can be implemented in one or more computing devices. The method includes receiving, from a portable device, (i) a vehicle identifier reported by a vehicle with which the portable device is establishing a short-range communication link, and (ii) an indication of a current location of the portable device, at a first time. The method also includes obtaining, an indication of a recent location at which the vehicle identifier was reported at a second time, comparing, the current location of the portable device to the recent location of the vehicle, in view of the first time and the second time. In response to determining that the current location is not proximate to the recent reported location of the vehicle, the method includes generating an indication that the reported identifier is likely falsified.

Another embodiment of these techniques is a portable computing device including a short-range communication interface to communicate with a vehicle, a long-range communication interface to communicate with a verification server, one or more processors coupled to the short-range communication interface, and a non-transitory computer-readable medium storing instructions. When executed on the one or more processors, the instructions cause the portable device to receive a vehicle identifier from the vehicle, determine a current location of the portable device, transmit the vehicle identifier and an indication of the current location to the verification server, and receive an indication of whether the vehicle identifier is likely falsified from the verification server.

Yet another embodiment of these techniques is a vehicle connection verification system including a communication interface and processing hardware coupled to the communication interface. The processing hardware is configured to receive an indication of a successfully established short-range communication link between a first portable device and a vehicle presenting a vehicle identifier, at a first geographic location. The processing hardware is further configured to store the vehicle identifier, an indication of the first geographic location, and an indication of the first time in a database. Still further, the processing hardware is configured to receive, at a second time subsequent to the first time, an indication that the first portable device or a second portable device is attempting to establish a short-range communication link with a vehicle presenting the vehicle identifier, at a second geographic location, and determine whether the vehicle identifier presented at the second time is likely falsified using the indications of the first geographic location, the second geographic location, the first time, and the second time.

DETAILED DESCRIPTION

Overview

Figure 1:
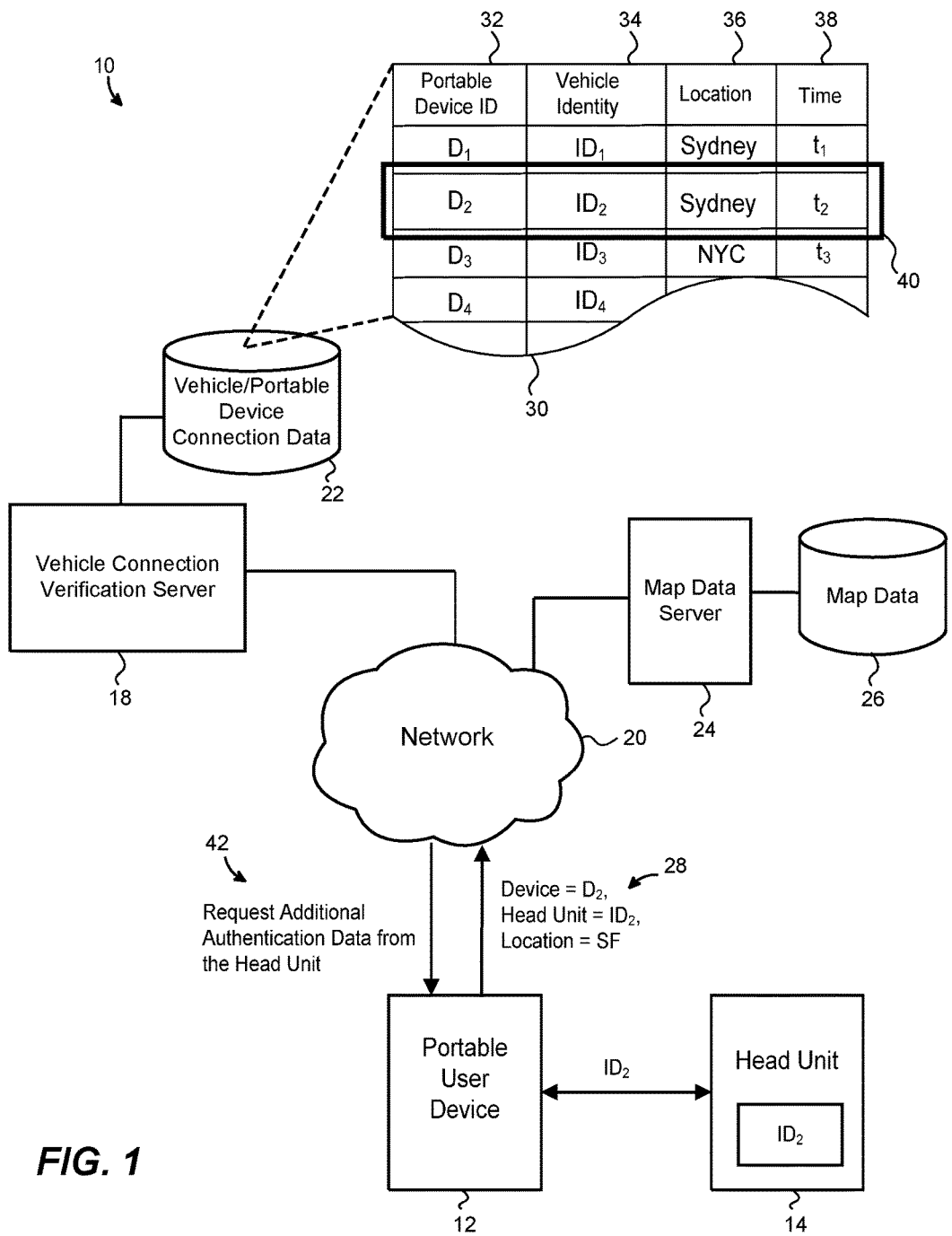
FIG. 1 is a block diagram of an example communication system in which a server determines a possible attempt at falsifying vehicle identity to gain access to a portable device.

A verification system of this disclosure identifies a potential attempt at spoofing (replicating or reusing in an unauthorized manner) or otherwise falsifying identity of a vehicle authorized communicate with a portable device. For example, the head unit of a vehicle can be authorized to receive mapping and navigation data from, and forward commands to, a user's smartphone. If the smartphone and the head unit do not authenticate each other, there is a risk that the user's privacy will be compromised. However, authentication based on key verification, such as verification according to the Needham-Schroeder technique, requires that a head unit manufacturer generate a unique private key. This requirement may be difficult to meet. In contrast, the verification of this disclosure does not require that the head unit and the smartphone implement a dedicated verification protocol.

More particularly, to detect a possible attempt at falsification, the verification system receives indications of established connections between a portable device and a vehicle. This data can include, for example, an identifier of the vehicle, an identifier of the portable device, and an indication of the location at which the portable device and the vehicle established and/or maintained a connection. The user of the portable device may operate certain controls and/or install certain applications to allow the portable device to transmit this data to the verification system. The verification system stores this data in a database as historic tuples {portable device identity, vehicle identifier, location, time}, for example.

Then, when this portable device or another portable device attempts to establish a new communication session with a vehicle, the portable device provides the reported vehicle identifier to the verification system. The verification system can use the database storing the historic tuples to determine whether the vehicle with the reported vehicle identifier recently has been "seen" in a geographic area proximate to the reported location. If there is a significant mismatch between the reported locations, the verification system determines that the vehicle identifier is probably spoofed or otherwise falsified. Depending on the implementation, the system the can provide a notification to the user advising that the user protect her portable device from unauthorized access and/or request additional signals to more accurately estimate the probability that vehicle identifier may have been spoofed, for example.

When assessing the probability that a vehicle identifier presented to a portable device has been falsified, the verification system also can compare the identifiers of portable devices used in attempts to establish short-range connections in different instances. For example, the verification system can consider same {portable device identifier 1, vehicle identifier}, reported at relatively remote locations at two different times, less suspicious than the {portable device identifier 1, vehicle identifier} and {portable device identifier 2, vehicle identifier} tuples reported at these two remote locations.

In an example scenario, the verification system receives an indication that a smartphone established a connection with a vehicle having a certain identifier in Sydney. Within a relatively brief interval (e.g., five hours), the verification system receives an indication that a vehicle reporting the same vehicle identifier is attempt to establish a connection with another smartphone in San Francisco. The verification system generates an indication that the vehicle in San Francisco may be using a spoofed identifier, and suggests that the user further verify the connection.

Example Communication Systems, Devices, and Methods

Next, an example communication system in which these verification techniques is discussed next, followed by a discussion of an example portable device and an example verification server that can operate in this communication system.

Referring first to FIG. 1, an example communication system 10 includes a portable device 12 attempting to establish a short-range communication link with a head unit 14 of a vehicle (not shown). The portable device 12 communicates with a vehicle correction verification server (for simplicity, "verification server") 18 via a communication network 20, which can be a wide area network such as the Internet. The verification server 18 is coupled to a vehicle/portable device connection database 22. The portable device 12 also communicates with a map data server 24, which is coupled to a map database 26.

The user device 12 can be a portable computing device such as a smartphone or a tablet computer, for example. An example implementation of the portable device 12 is discussed with reference to FIG. 2. Each of the servers 18 and 24 can be implemented as a single device or a group of servers (e.g., a set of front-end servers and a set of back-end servers). The corresponding databases 22 and 26 can be implemented in any suitable manner, such as relational databases implemented in dedicated storage devices, dedicated groups of storage devices, or on the servers 22 and 26, for example. Depending on the embodiment, the servers 18 and 24 can be implemented as a single network node associated with a same online mapping service, or as separate network nodes associated with the same or different services.

In operation, the portable device 12 and the head unit 14 attempt to establish a short-range communication link via a wired link such as Universal Serial Bus (USB) or a wireless link such as IEEE 802.15 (Bluetooth®)), for example. The head unit 14 reports identifier $ID_2$ to the portable device 12. In general, the reported vehicle identifier can be any suitable number or alphanumeric string sufficiently unique to the head unit 14 and/or the vehicle in which the head unit 14 is installed. For example, the identifier $ID_2$ can be the serial number of the head unit 14 or the Media Access Control (MAC) address of the USB port on the head unit 14.

After the portable device 12 receives the identifier $ID_2$, the portable device 12 determines its current location. To this end, the portable device can use any suitable technique, including those known in the art. As a more specific example, the portable device can determine its current Global Positioning Service (GPS) coordinates. Depending on the implementation, different levels of precision can be used when determining the location of the portable device 12 for the purposes of detecting potential spoofing at the server 18. The current location of the portable device 12 in one embodiment is approximated to the nearest mile, for example.

As schematically illustrated in FIG. 1, the portable device 12 transmits a portable device identifier (e.g., the phone number or the serial number of the portable device) along with the identifier $ID_2$ and an indication of the current location of the portable device 12 to the verification server 18, as part of data 28. In this example, the portable device 12 indicates that the identifier is $ID_2$, and that its current location is in San Francisco. The user of the portable device 12 in some embodiments may operate certain controls and/or install certain applications to allow the portable device 12 to transmit data 28 to the verification server 18.

The verification server 18 compares the data 28 to one or several relevant historic tuples stored in the database 22, in view of the time t at which the data 28 is received. In this example, the database 22 stores a table 30 in which an entry includes a device identifier 32, a vehicle identity 34 (identifying a vehicle and/or a head of the vehicle), a location indication 36, and a time indication 38. The verification server 18 determines that entry 40, which stores an indication that a connection between a certain user device and vehicle with identity=$ID_2$ was established (or last reported) in Sydney at time $t_2$. The verification server 18 compares the times t and $t_2$ to determine whether the vehicle is likely to have traveled, or been transported over, the distance between Sydney and San Francisco. To this end, the verification server 18 can estimate the average speed of travel and, in some implementations, adjust the estimate in view of other factors, such as availability of an interrupted driving route, for example. For example, if the difference between t and $t_2$ is only a couple of hours, the verification server 18 may determine that the vehicle identifier $ID_2$ is likely spoofed.

After determining that the reported vehicle identifier $ID_2$ is suspicious, the verification server 18 can transmit a request 42 for additional authentication data to the portable device 12. In response to the request 42, the portable device 12 can take one or more appropriate actions such as, for example, generate an indication of a suspicious connection via the user interface of the portable device 12, request additional information from the head unit 14 to further verify its identity, disable the short-range connection between the head unit 12 and the head unit 14, etc., depending on the implementation and/or configuration.

On the other hand, when the verification server 18 does not determine that the vehicle identifier $ID_2$ is suspicious in view of the historic tuples in the database 22, the verification server 18 can provide an appropriate indication (not shown) to the portable device 12, instead of the request 42. In response, the portable device can provide data to the head unit 14, such as map data received from the map data server 24, or any other data such as music, images, etc. When the portable device provides a digital map to the head unit 14, the map data server 24 can retrieve map data from the map database 26 and/or generate navigation data, and provide this data to the portable device 12 for generating a digital map and/or navigation instructions. More generally, the portable device 12 can request verification of the head unit 14 for exchanging any type of data, such as phone numbers, multimedia content, etc.

With continued reference to FIG. 1, the database 22 in some implementations does not include some of the columns of the table 30 illustrated in FIG. 1. For example, the database 22 may not store identities of portable devices, and effectively store only historical tuples that indicate reported locations of vehicles at different times.

Figure 2:
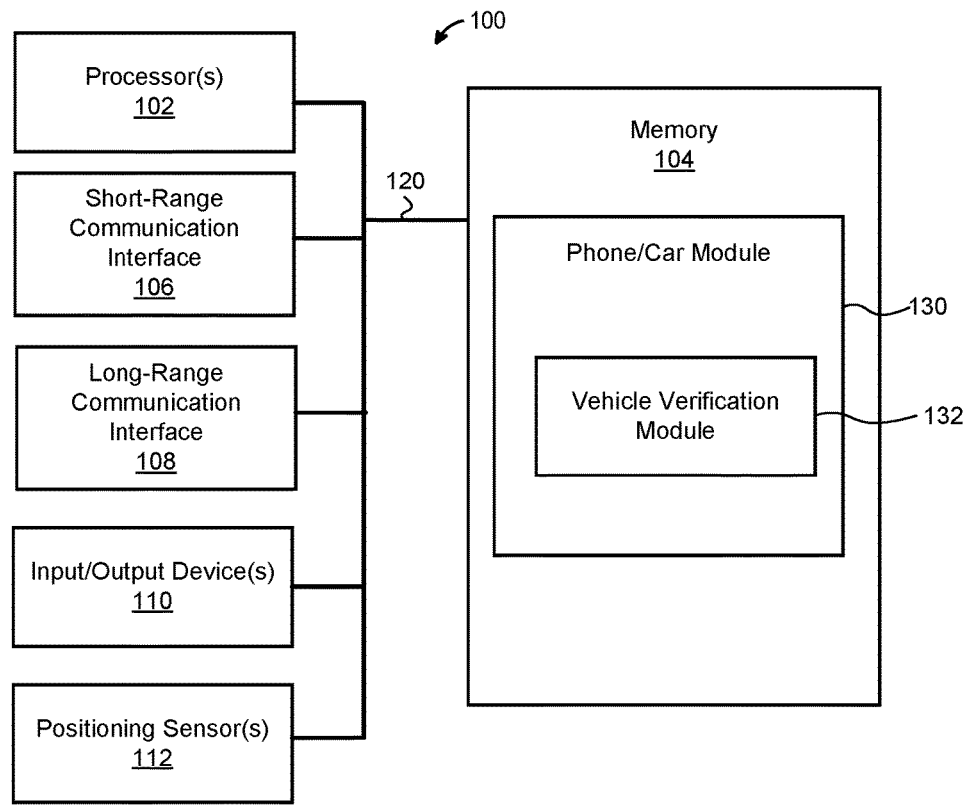
FIG. 2 is a block diagram of an example portable device that can operate in the system of FIG. 1.

Now referring to FIG. 2, a portable user device 100 can operate in the communication system 10 (as the portable device 12, for example) or in another suitable computing environment. The user device 100 includes one or more processor(s) 102, such as a central processing unit (CPU), for example. The user device also includes a memory 104 readable by the processor(s) 102. The memory 104 can include one or several persistent memory modules such as a flash memory, hard disc, optical disc, etc. and/or one or several non-persistent memory modules such as a Random Access Memory (RAM) module. In some implementations, the one or more processor(s) also include a Graphics Processing Unit (GPU) to more accurately and efficiently render graphics content. Further, the user device 100 can include a wired and/or wireless short-range communication interface 106 that supports a scheme such as Bluetooth®, Wi-Fi Direct®, or USB, and a long-range communication interface 108 that supports a scheme such as 802.11 (Wi-Fi®) or a suitable telephony protocol, for example.

The user device 100 further includes input and output device(s) 110 such as a touchscreen, a microphone, a non-touch screen, a keyboard, a mouse, speakers, etc. Further, the user device 10 in this example implementation includes positioning sensor(s) 112 which may include a GPS sensor and/or a proximity sensor, for example. The user device 100 in some embodiments can determine its current location using the communication 106 and 108 to locate Wi-Fi hotspots having known positions and perform triangulation. The components 102-112 can be interconnected via a digital bus 120, for example.

The memory 104 stores a phone/car module 130 that provides data to a vehicle and, in some cases, receives data from the vehicle. In general, the phone/car module 130 can provide any suitable data to the head unit of the vehicle or otherwise to the electronic components of the vehicle: digital music, images, instructions, phone numbers, contacts, etc. In one embodiment, the phone/car module 130 operates as a digital mapping module that generates an interactive digital map for display via a screen of the portable device 100 and/or the head unit of a vehicle. To this end, the user device 100 can receive map data in vector and/or raster format from a map data server, such as the map data server 24 of FIG. 1, for example. The phone/car module 130 can include compiled instructions, non-compiled instructions interpreted by another software module, or both. The phone/car module 130 can be, for example, a standalone application or a library or a plugin.

The phone/car module 130 includes a vehicle verification module 132 configured to receive a vehicle identifier via the short-range communication interface 106, provide the vehicle identifier to a verification server (such as the server 18) via the long-range communication interface 108, receive an indication of whether the verification server 18 has detected potential falsification, etc. When the vehicle verification module 132 receives an indication that the vehicle probably presented falsified identity, the vehicle verification module 132 can prevent the phone/car module 130 from providing data, and particularly personal data, to the vehicle. If, on the other hand, the vehicle verification module 132 receives an indication that the vehicle probably presented true identity, the vehicle verification module 132 can allow the phone/car module 130 to provide data to the vehicle. Example operation of the vehicle verification module 132 is further discussed with reference to FIG. 4.

Figure 3:
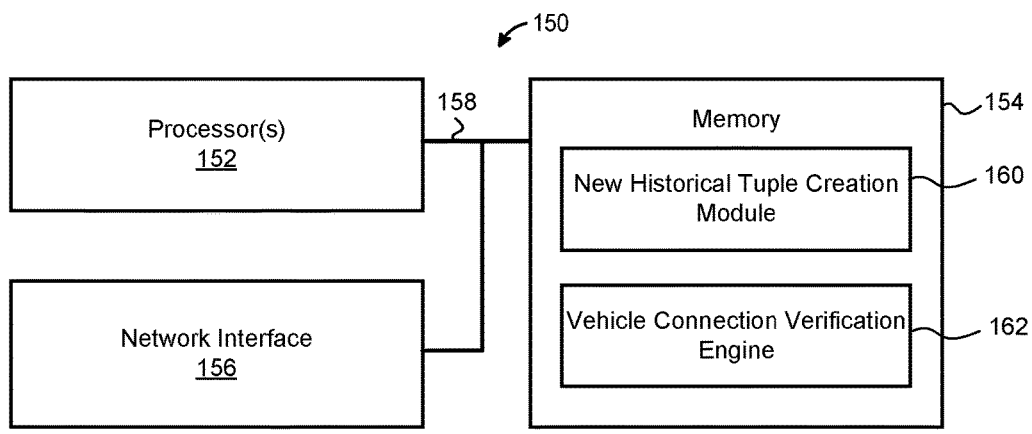
FIG. 3 is a block diagram of an example server that can operate in the system of FIG. 1.

Next, FIG. 3 illustrates an example verification server 150 which can operate as the verification server 18 of FIG. 1, for example. The server 150 includes one or more processor(s) 152, a memory 154, and a network interface 156, interconnected via a digital bus 158. The memory 154 stores new historical tuple creation module 160 and a vehicle connection verification engine 162. Each of the modules 160 and 162 can be implemented, for example, using software instructions executable on the processor(s) 152.

In operation, the new historical tuple creation module 160 receives an indication of a successfully established short-range communication link between a portable device and a vehicle and stores this indication in a database (such as the database 22 of FIG. 1) as a historic tuple. In general, the module 160 can create any number of historic tuples for a vehicle identifier. The module 160 can access the database via the network interface 156, or the database can be implemented in the memory 154 as a set of one or more tables, such as the table 30 illustrated in FIG. 1. Example operation of the module 160 is further discussed with reference to FIG. 5.

The vehicle connection verification engine 162 in operation receives an indication that a portable device is attempting to establish a short-range communication link with a vehicle. The engine 162 determines whether records corresponding to the vehicle identifier included in the indication are available in the database. If the engine 162 identifies one or more of these records, the engine 162 determines whether the vehicle identifier included in the received indication is likely falsified, as discussed in more detail with reference to FIG. 6.

Referring generally to FIGS. 2 and 3, it will be understood that the user device 100 and the server 150 can include additional components or, conversely, be implemented without some of the illustrated components. Further, two or more of the illustrated components can be implemented as a single component. Still further, some of the components illustrated as single blocks can be made up of multiple interconnected components.

Figure 4:
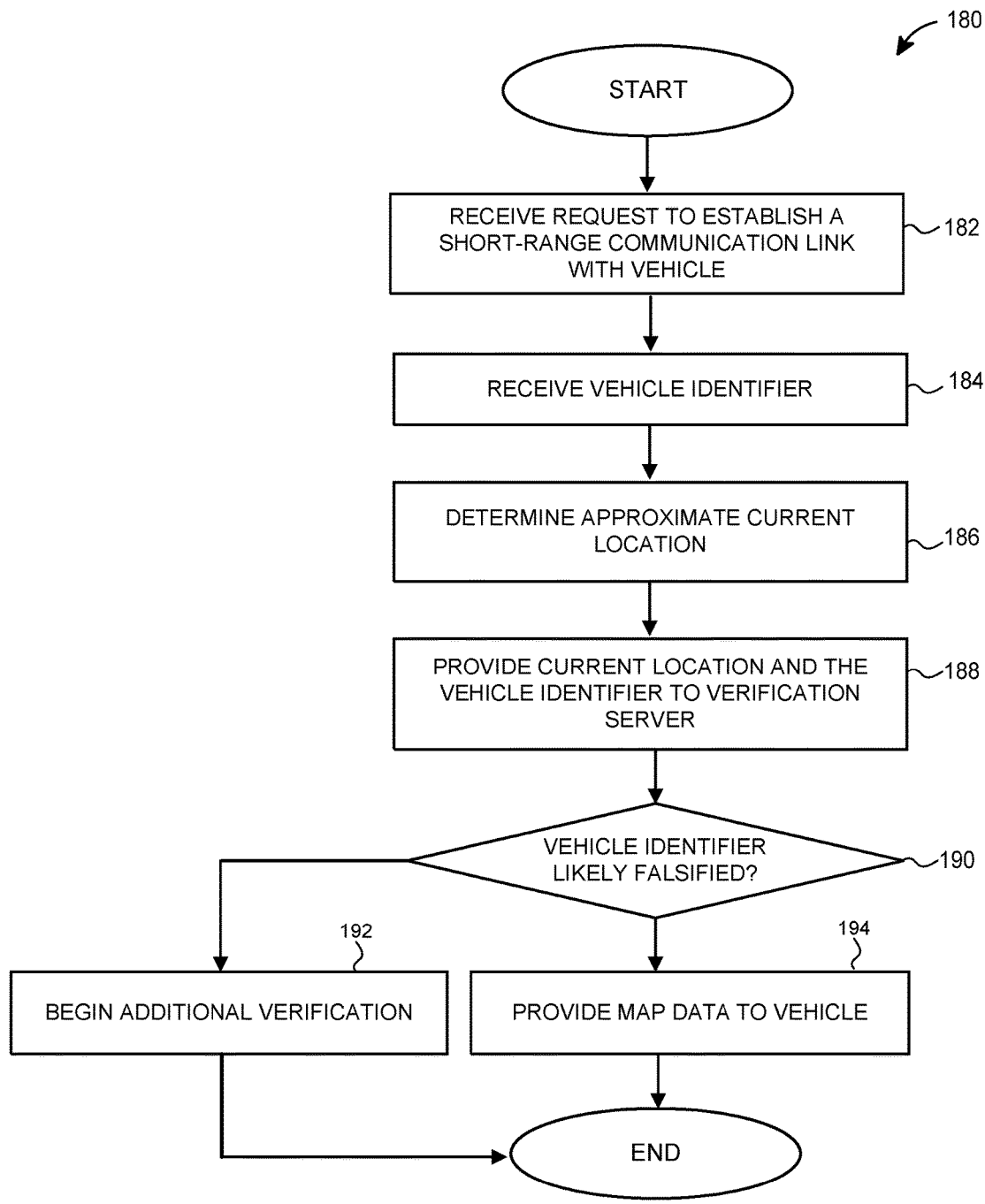
FIG. 4 is a flow diagram of an example method for determining whether a connection with a vehicle can be safely established, which can be implemented in the portable device of FIG. 2.

Referring to FIG. 4, a method 180 can be implemented in the vehicle verification module 132 as a set of instructions executable on one or more processors, for example. The method 180 begins at block 182, where a request to establish a short-range communication link with a vehicle is received. Depending on the implementation, the request can be received from the user interface of the portable user device or from the vehicle via a short-range communication interface, for example. As discussed above, the short-range communication link can be wired or wireless. In a typical scenario, the portable user device is located inside the vehicle.

At block 184, a vehicle identifier is received. The vehicle identifier in general can identify any component of the vehicle and/or the head unit of the vehicle that can substantially uniquely identify the vehicle.

The current location of the portable device is determined at block 186. In some implementations, the determined location is made less precise by rounding off the GPS coordinates, for example, to the nearest mile.

At block 188, an indication of the current location and the received vehicle identifier are provided to a verification server. In some implementations, the identifier of the portable device is also provided. Further, an indication of current time can be provided to the verification server in some embodiments. An indication of whether the vehicle identifier was likely spoofed or otherwise falsified is received in response to the information transmitted at block 188.

If the verification server indicates that the vehicle identifier was likely falsified (block 190), the flow proceeds to block 192, where an additional verification procedure can be triggered. For example, the verification server may provide several photographs of head units and ask the user to select the photograph that matches the head unit to which the portable is currently trying to connect. Otherwise, if the verification server indicates that the vehicle identifier is probably true, the flow proceeds to block 194. Map data, navigation data, or any other suitable type of data can be provided to the head unit at block 194.

Figure 5:
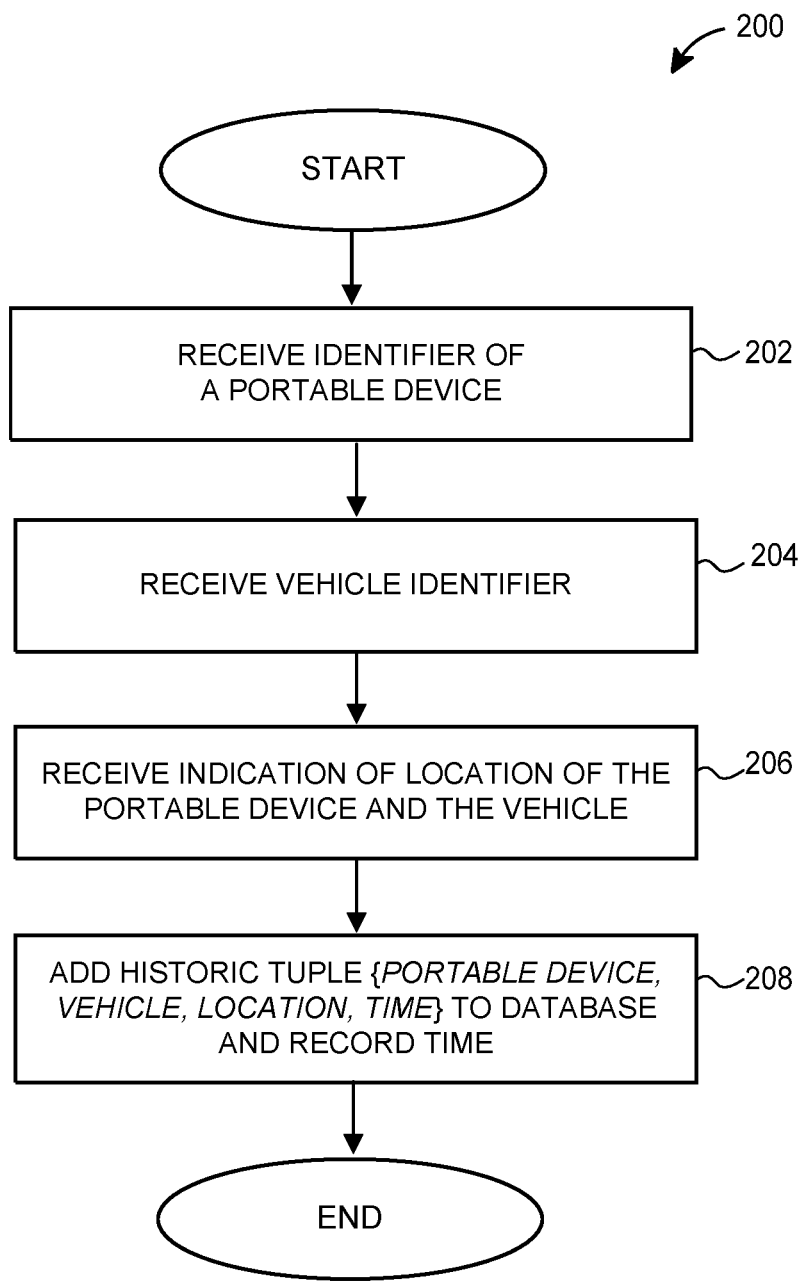
FIG. 5 is a flow diagram of an example method for generating historic tuples including indications of vehicle identity, portable device identity, and location, which can be implemented in the server of FIG. 3.

A method 200 illustrated in FIG. 5 can be implemented in the historical tuple creation module 160 as a set of instructions executable on one or more processors, for example. At blocks 202-206, an indication that a portable device successfully connected to a vehicle is received. More particularly, an identifier of a portable device is received at block 202, a vehicle identifier is received at block 204, and an indication of the current location of the portable device is received at block 206.

A historic tuple including some or all of the information received at blocks 202-206 is generated at block 208. The historic also can include an indication of the time at which the indication is received. The time can be included in the received indication or determined upon receipt of the indication.

It is noted that this indication need not always correspond to the time when the portable device first connects to the vehicle. Rather, a portable device that maintains a short-range communication link with a vehicle can periodically or randomly report the current location of the vehicle. Thus, a certain historic tuple can indicate the last location at which a connection between a portable device and a vehicle was reported.

Figure 6:
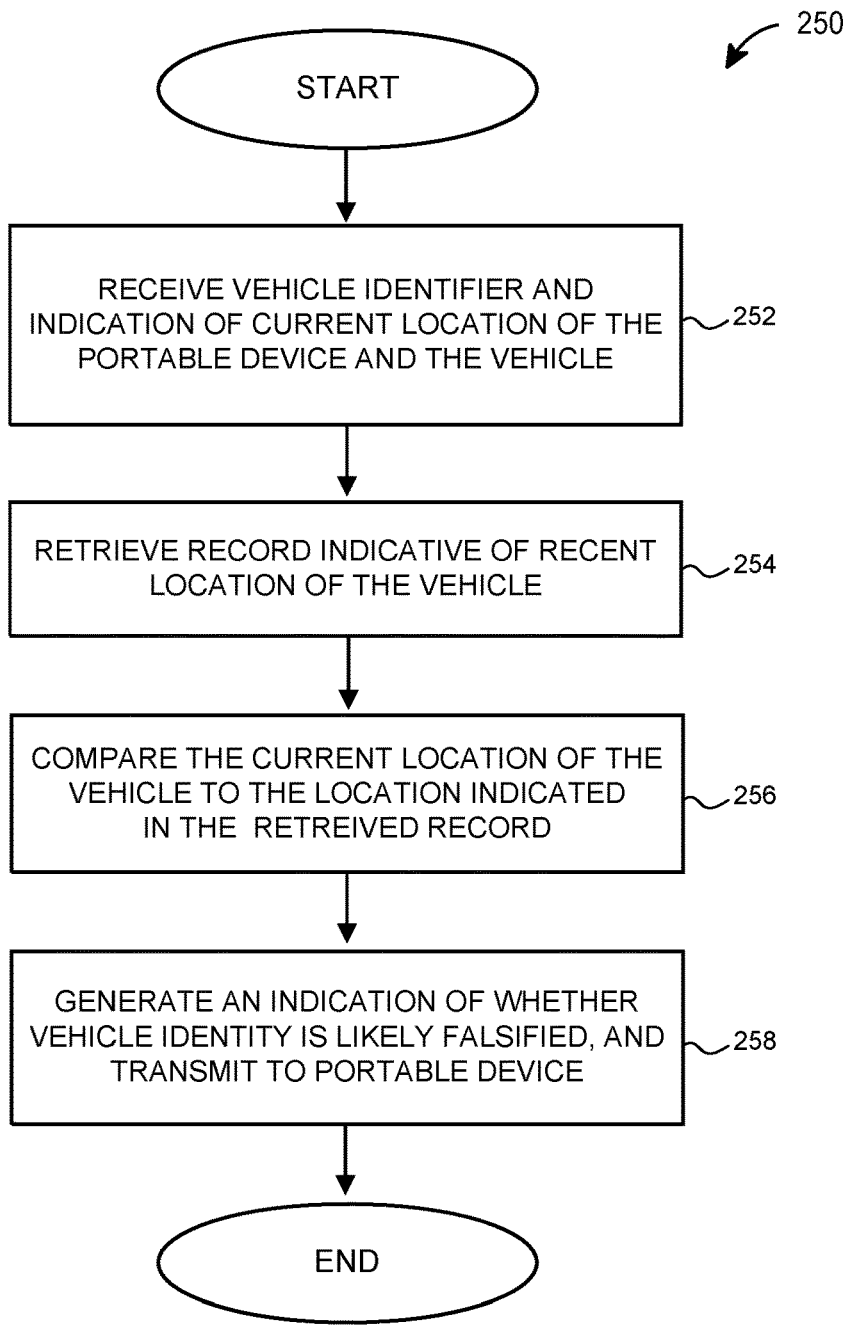
FIG. 6 is a flow diagram of an example method for determining a possible attempt at spoofing vehicle identity using historic tuples, which can be implemented in the server of FIG. 3.

FIG. 6 illustrates a method 250 for determining a possible attempt at spoofing vehicle identity, which can be implemented in the vehicle connection verification engine 162, for example. The method 250 begins at block 252, where a vehicle identifier presented to a portable device and an indication of the current location of the portable device are received from the portable device. In some implementations, the identity of the portable device is received at block 252 as well.

Next, a record corresponding to the reported vehicle identifier is retrieved (block 254), and, at block 256, the geographic location indicated in the record is compared to the indication of the geographic location received at block 252. The comparison can be performed in view of the difference in time between the corresponding indications to determine whether the same vehicle likely traveled between the two locations in this time.

When a significant difference between the geographic locations is detected in view of a relatively brief period of time between the creation of the historic tuple and receipt of the indication at block 252, a message is generated indicating that the vehicle identifier is likely falsified (block 258). In some embodiments, additional signals can be considered at block 256 to more accurately estimate the probability of falsification. For example, the identity of the portable device can be received at block 252 and compared to the corresponding field in the record retrieved at block 254. Otherwise, if no significant difference between the geographic locations is detected, an indication that the vehicle identifier is likely not falsified is generated at block 258.

In any case, the indication can be provided to the portable device to either prevent the portable device from sharing data with the vehicle or confirm that the portable device can share the data with the vehicle.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a specialpurpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for detecting potential attempts at falsifying vehicle identity through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A vehicle connection verification system comprising:
   a communication interface; and
   processing hardware coupled to the communication interface, the processing hardware configured to:
      receive, at a first time, an indication of a successfully established short-range communication link between a first portable device and a first vehicle presenting a vehicle identifier, at a first geographic location,
      store the vehicle identifier, an indication of the first geographic location, and an indication of the first time in a database,
      receive, at a second time subsequent to the first time, an indication that the first portable device or a second portable device is attempting to establish a short-range communication link with the first or a second vehicle presenting the vehicle identifier, at a second geographic location, and
      determine whether the vehicle identifier presented at the second time is likely falsified in view of (i) a distance between the first geographic location and the second geographic location and (ii) a difference between the first time and the second time.

2. The vehicle connection verification system of claim 1, wherein the processing hardware is further configured to:
   in response to determining that the vehicle identifier presented at the second time is likely falsified, prevent the short-range communication link from being established.

3. The vehicle connection verification system of claim 1, wherein the processing hardware is further configured to:
   in response to determining that the vehicle identifier presented at the second time is likely falsified, transmit a request for additional verification data to the first portable device or the second portable device.

4. The vehicle connection verification system of claim 3, wherein the processing hardware is configured to:
   transmit a plurality of photographs including a photograph of at least a portion of the vehicle corresponding to the vehicle identifier, and
   request, from the first portable device or the second portable device, a selection of the photograph of at least the portion of the vehicle corresponding to the vehicle identifier.

5. The vehicle connection verification system of claim 1, wherein the vehicle identifier corresponds to a MAC address of a USB port on a head unit of the vehicle.

6. The vehicle connection verification system of claim 1, wherein the processing hardware is further configured to determine an average speed of travel of the vehicle using the first time and the second time.

7. The vehicle connection verification system of claim 6, wherein to determine the average speed of travel, the processing hardware is further configured to determine availability of a driving route between the first geographic location and the second geographic location.

8. A computer-implemented method for vehicle connection verification, the method comprising:
   receiving, at a first time, an indication of a successfully established short-range communication link between a first portable device and a first vehicle presenting a vehicle identifier, at a first geographic location,
   storing the vehicle identifier, an indication of the first geographic location, and an indication of the first time in a database,
   receiving, at a second time subsequent to the first time, an indication that the first portable device or a second portable device is attempting to establish a short-range communication link with the first or a second vehicle presenting the vehicle identifier, at a second geographic location, and
   determining, via one or more processors, whether the vehicle identifier presented at the second time is likely falsified in view of (i) a distance between the first geographic location and the second geographic location and (ii) a difference between the first time and the second time.

9. The computer-implemented method of claim 8, further comprising:
   in response to determining that the vehicle identifier presented at the second time is likely falsified, preventing the short-range communication link from being established.

10. The computer-implemented method of claim 8, further comprising:
    in response to determining that the vehicle identifier presented at the second time is likely falsified, transmitting a request for additional verification data to the first portable device or the second portable device.

11. The computer-implemented method of claim 10, further comprising:
    transmitting a plurality of photographs including a photograph of at least a portion of the vehicle corresponding to the vehicle identifier, and
    requesting, from the first portable device or the second portable device, a selection of the photograph of at least the portion of the vehicle corresponding to the vehicle identifier.

12. The computer-implemented method of claim 8, wherein the vehicle identifier corresponds to a MAC address of a USB port on a head unit of the vehicle.

13. A non-transitory tangible computer-readable storage medium having executable computer code stored thereon for vehicle connection verification, the code comprising a set of instructions that causes one or more processors to perform the following:
- receive, at a first time, an indication of a successfully established short-range communication link between a first portable device and a first vehicle presenting a vehicle identifier, at a first geographic location,
- store the vehicle identifier, an indication of the first geographic location, and an indication of the first time in a database,
- receive, at a second time subsequent to the first time, an indication that the first portable device or a second portable device is attempting to establish a short-range communication link with the first or a second vehicle presenting the vehicle identifier, at a second geographic location, and
- determine whether the vehicle identifier presented at the second time is likely falsified in view of (i) a distance between the first geographic location and the second geographic location and (ii) a difference between the first time and the second time.

14. The non-transitory tangible computer-readable storage medium of claim 13, wherein the set of instructions further causes one or more processors to:
- in response to determining that the vehicle identifier presented at the second time is likely falsified, prevent the short-range communication link from being established.

15. The non-transitory tangible computer-readable storage medium of claim 13, wherein the set of instructions further causes one or more processors to:
- in response to determining that the vehicle identifier presented at the second time is likely falsified, transmit a request for additional verification data to the first portable device or the second portable device.

16. The non-transitory tangible computer-readable storage medium of claim 15, wherein the set of instructions further causes one or more processors to:
- transmit a plurality of photographs including a photograph of at least a portion of the vehicle corresponding to the vehicle identifier, and
- request, from the first portable device or the second portable device, a selection of the photograph of at least the portion of the vehicle corresponding to the vehicle identifier.

17. The non-transitory tangible computer-readable storage medium of claim 13, wherein the vehicle identifier corresponds to a MAC address of a USB port on a head unit of the vehicle.

* * * * *